United States Patent [19]

Brueggemann

[11] 4,247,160
[45] Jan. 27, 1981

[54] SCANNER WITH REFLECTIVE PYRAMID ERROR COMPENSATION

[75] Inventor: Harry P. Brueggemann, San Marino, Calif.

[73] Assignee: Xerox Corporation, Stamford, Conn.

[21] Appl. No.: 23,940

[22] Filed: Mar. 26, 1979

[51] Int. Cl.³ .............................. G02B 27/1
[52] U.S. Cl. .................................. 350/6.8
[58] Field of Search ............ 350/6.8, 199, 6, 1, 350/6.7, 230, 285; 358/199; 355/45

[56] References Cited

U.S. PATENT DOCUMENTS

| | | | |
|---|---|---|---|
| 3,750,189 | 7/1973 | Fleischer | 350/6.91 |
| 3,973,826 | 8/1976 | Lobb | 350/6.8 |
| 3,995,110 | 11/1976 | Starkweather | 350/6.8 |
| 4,054,360 | 10/1977 | Oosaka et al. | 350/6.8 |
| 4,070,089 | 1/1978 | Grafton | 350/6.8 |
| 4,116,527 | 9/1979 | Sick | 350/6.9 |
| 4,123,135 | 10/1978 | Rabedeau | 350/6.8 |

FOREIGN PATENT DOCUMENTS 2834085  2/1979  Fed. Rep. of Germany ............ 350/6.8

*Primary Examiner*—John K. Corbin
*Assistant Examiner*—B. W. de los Reyes

[57] ABSTRACT

A laser beam scanner having a positive cylinder mirror located between the polygon scanner and the photosensitive surface. The positive cylinder mirror, which has power in the sagittal (cross-scan) plane but no power in the tangential (scan) plane, minimizes scan-to-scan spot position errors due to angular alignment errors between adjacent facets of the polygon scanner without introducing significant sagittal field curvature. Residual sagittal field curvature is compensated for by providing a negative refractive cylinder lens, with power in the sagittal plane, between the cylindrical mirror and the polygon scanner.

2 Claims, 4 Drawing Figures

SCANNER WITH REFLECTIVE PYRAMID ERROR COMPENSATION

BACKGROUND OF THE INVENTION

To provide for high scan rates, many conventional raster output scanners utilize a multi-faceted rotating polygon as the scanning element. Such scanners also include a positive pyramid error compensating cylinder lens, known also as a wobble correction cylinder lens, to minimize scan-to-scan spot position errors due to angular alignment errors in the cross-scan plane between adjacent facets of the scanning polygon.

For many advanced raster output scanner applications, optical systems that are smaller and of lower cost than conventional optical systems are required. A reduction in size of the optical scanning system with no corresponding change in scan length means that scan angles, i.e., the angle through which the beam must be deflected, are increased. Due to the increased scan angle, the sagittal field curvature produced by the positive pyramid error compensating cylinder lens increases to objectionable levels which require correction.

One experimental attempt to compensate for the increased sagittal field curvature produced by the pyramid error compensating cylinder lens provided a negative cylinder lens of low refractive index near the positive cylinder lens. However, the two cylinder lenses do not combine to satisfactorily eliminate sagittal field curvature. In another attempt to eliminate sagittal field curvature, the positive cylinder lens was curved in the tangential plane to become a toroid. The curvature and power of the toroid were small in the tangential direction, so that making the cylinder lens into a toroid had only a slight effect on tangential field curvature, while it had a large effect on sagittal field curvature since the power in the sagittal plane is large. Thus, this toroidal bending approach reduces the problem of sagittal field curvature, but a toroid is expensive to make out of glass, and replicating it out of plastic would appear to require expensive and lengthy research. Accordingly, other, less costly, ways in which to solve the sagittial field curvature produced by the positive pyramid error compensating cylinder lens is desired.

SUMMARY OF THE INVENTION

In accordance with the invention, the pyramid error compensating cylinder lens of the prior art is replaced by a cylinder mirror oriented such that it has power in the sagittal plane but no power in the tangential plane. A scanner system utilizing such a cylinder mirror for pyramid error compensation has significantly reduced sagittal field curvature which approaches the diffraction limit, the residual sagittal field curvature being due to the axial translation of the polygon facets as the polygon rotates. To compensate for the residual sagittal field curvature, a second embodiment of the invention provides a refractive cylinder lens between the cylindrical mirror and the rotating polygon. The refractive cylinder lens contributes a small amount of sagittal field curvature of the appropriate sign, to reduce the residual field curvature and thereby reduce the sagittal field curvature to below the diffraction limit. Thus, the invention provides relatively inexpensive ways to reduce or eliminate sagittal field curvature problems present in prior art scanner system using a pyramid error compensating cylinder lens.

BRIEF DESCRIPTION OF THE DRAWINGS

Specific embodiments of the invention are described in detail below with reference to the drawings for those embodiments, in which.

DETAILED DESCRIPTION OF THE INVENTION

Figure 1:
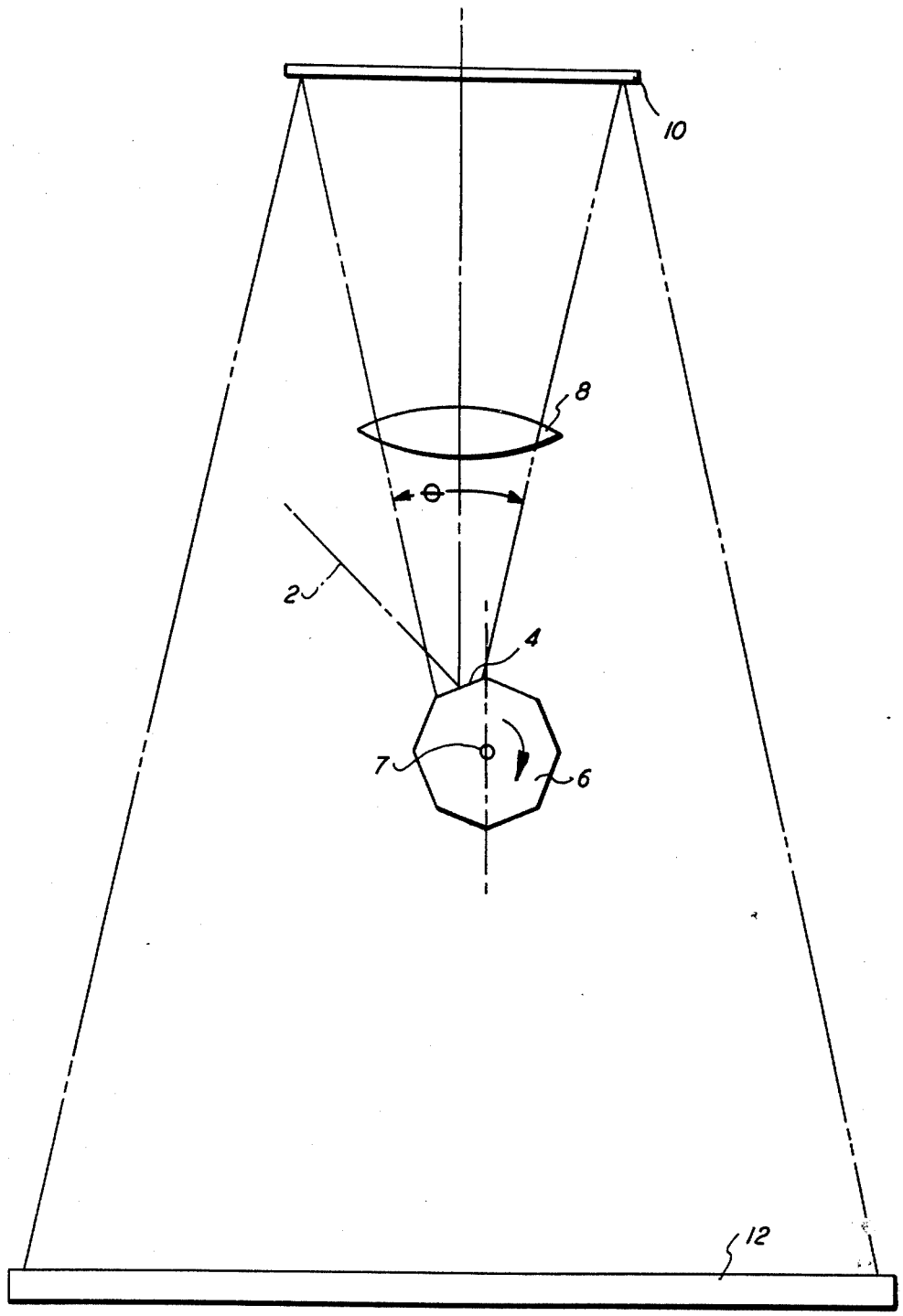
FIGS. 1 and 3 are plane views in the tangential plane of scanners in accordance with the invention.
Figure 2:
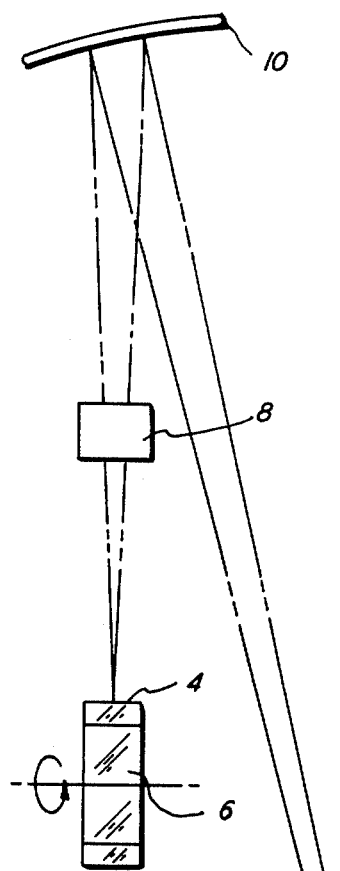

Referring first to FIGS. 1 and 2, there are shown plane views in the tangential plane and sagittal plane, respectively, of a scanner in accordance with the invention. In this disclosure, the term "tangential" means the plane containing both the principal ray and the central axis of a symmetric optical system, that is, the plane of the scan of the scanning beam, and the term "sagittal" means the plane containing the principal ray which is normal to the tangential plane, that is, the plane normal to the plane of the scan.

Referring further to FIGS. 1 and 2, a monochromatic coherent light beam 2 which may be produced by a conventional laser (not shown) and which may be intensity modulated by a conventional light modulator (not shown) is incident upon a facet 4 of a rotating polygon 6. Laser beam 2 is shown as illuminating the facet 4 is a conventional overfilled manner, that is, the laser beam fan is wide enough so that it covers all portions of facet 4 during its entire scan whereby the laser beam is scanned across the angle as the facet 4 is rotated pursuant to rotation of polygon 6 about it axis of rotation 7 by a conventional drive motor (not shown). However, the error compensation concept of the invention will perform just as well with facet tracking wherein the laser beam follows each facet of the polygon 6 during its active scanning, or an under-filled facet.

After reflection from facet 4, the laser beam passes through a post-polygon lens 8 and is then reflected by a positive cylinder mirror 10 such that the laser beam is incident upon, and scanned across, the photosensitive surface 12. The error compensation concept will perform just as well with a pre-polygon lens, however the severe tangential field curvature inherent in a pre-polygon lens system makes it pointless to correct sagittal field curvature. Scanner lens 8 has appropriate power in the tangential plane such that the laser beam is focussed at the surface 12. The beam 2 is not defocussed by the cylinder mirror 10 because mirror 10 has a flat surface and hence no power in the tangential plane. The positive cylinder mirror 10 does however have power in the sagittal plane, and the effect of that power is shown in FIG. 2. In FIG. 2 the laser beam is shown in the center of scan position, but since the laser beam lies in the tangential plane for all scan positions, and moves along the neutral axis of the positive cylinder mirror, all beam positions would be the same projected onto the sagittal plane.

Pursuant to this invention, it was postulated (since no third order aberration theory exists for cylindrical optics) that positive cylinder mirror 10, oriented to have power in the sagittal plane but no power in the tangential plane, will have no sagittal field curvature. It should have no tangential field curvature because it has no tangential power, and it should have no sagittal field curvature because the sagittal section of a spherical mirror (for which third order aberration theory exists)

has no sagittal field curvature. Studies directed to the foregoing postulate revealed that a thin cylinder, with no power in the tangential plane but power in the sagittal plane, has no tangential field curvature but has sagittal field curvature given by:

$$C_s = 1/f_s(1+1/n)(1-H)^2$$

where $C_s$ is the field curvature (reciprocal radius of curvature) in the sagittal plane, $f_s$ is the focal length (reciprocal power) in the sagittal plane, n is the index of refraction of the material of the cylinder, and H is the ratio of the height of the scanning beam at the cylinder mirror to the height of the scanning beam at the photosensitive surface i.e., the ratio of the length of mirror 10 to the length of the photosensitive surface 12, as shown in FIG. 1. Since for a mirror the index of refraction is $-1$, the factor $(1+1/n)$ is zero and the cylinder mirror has no sagittal field curvature.

In practice, to avoid interference between the elements of the scanner lens 8 and the laser beam, the laser beam is made to strike the polygon facets at an angle in the tangential plane, instead of normal to the facets. In addition, to avoid interference between the laser beam after the positive cylinder mirror 10 and the first part of the scanner, the positive cylinder mirror 10 is tilted about its neutral axis by a small amount, about 5 degrees, in the sagittal plane, as shown in FIG. 2. Since the cylindrical mirror is tilted about its neutral axis, and its neutral axis is a straight line in the tangential plane, no bow is introduced into the scan line at the photosensitive surface by the tilt of mirror 10.

Figure 4:
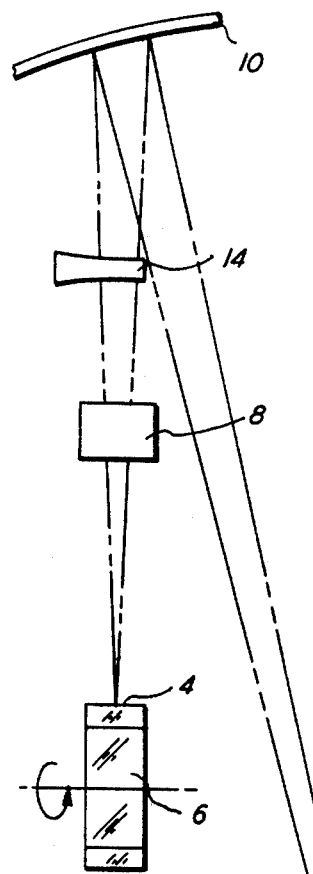
FIGS. 2 and 4 are plane views in the sagittal plane of the scanners of FIGS. 1 and 3.
Figure 3:
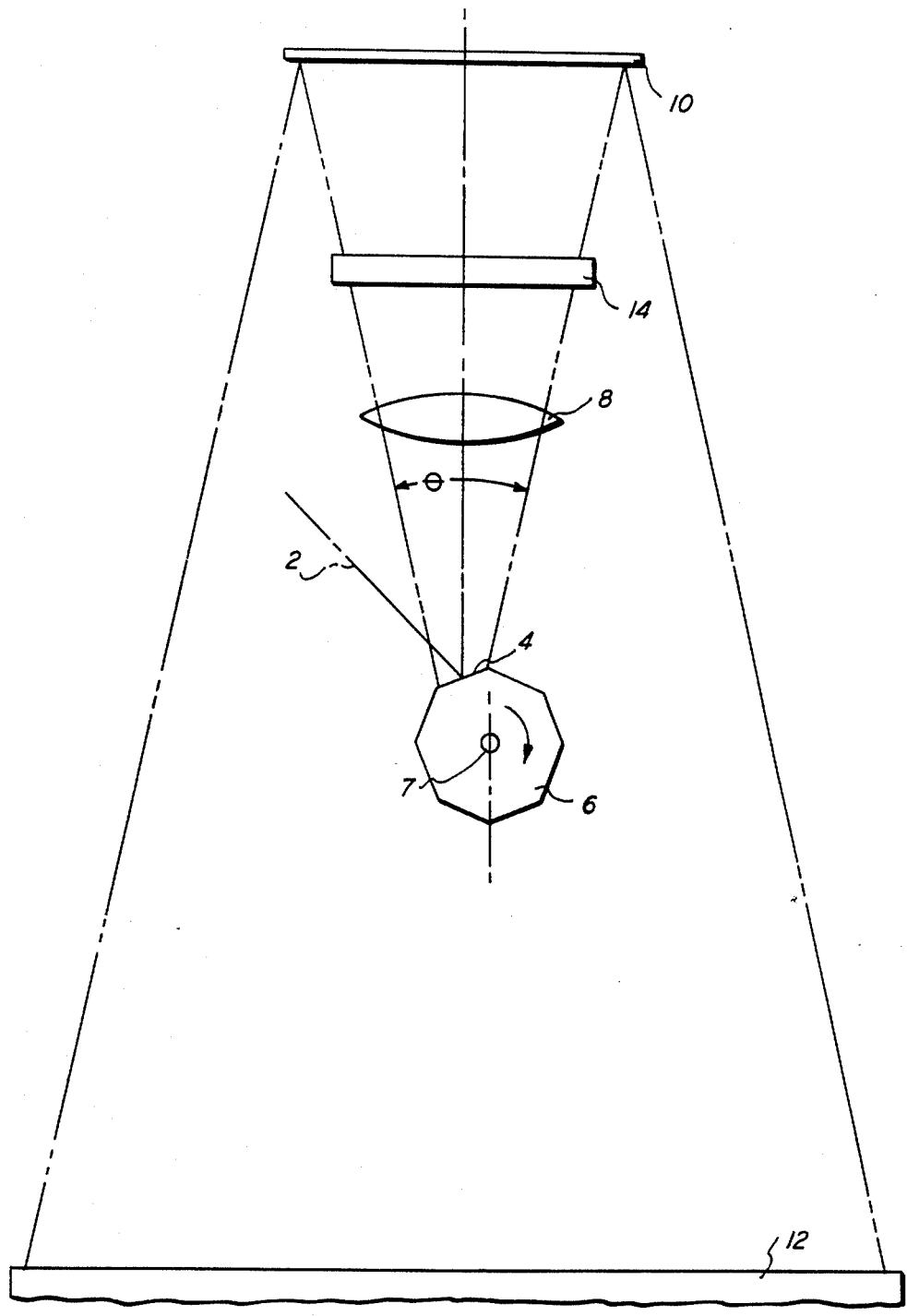

The inclusion of the positive cylindrical mirror 10 in the system of FIGS. 1 and 2 permits that system to have significantly reduced sagittal field curvature but there may still be some residual sagittal field curvature due to the axial translation of the polygon facets as the polygon rotates. To compensate for the residual sagittal field curvature, a negative refractive cylinder lens 14 is included between scanner lens 8 and positive cylindrical mirror 10 as shown in FIGS. 3 and 4 wherein scanner components corresponding to like scanner components of FIGS. 1 and 2 have the same reference numerals. Negative cylinder lens 14 is oriented to have power in the sagittal plane but no power in the tangential plane. Having power in the sagittal plane, lens 14 contributes a small amount of negative sagittal field curvature which reduces the residual field curvature.

So that the power of the positive cylinder mirror 10 and the negative cylindrical lens 14 is clearly evident, the width of those scanner components is exaggerated in FIGS. 2 and 4. As specific examples, the positive cylinder mirror 10 can have a curvature of $+0.10991950$ (9.0976 inches radius of curvature) and the negative cylindrical lens 14 can have curvatures (in the XZ plane) of $+0.16294866$ and $-0.16294866$ (6.1369 inches radius of curvature).

I claim:

1. An optical scanning system which compensates for alignment errors between adjacent facets of a scanning polygon while controlling sagittal field curvature, comprising, a light source for generating a light beam, a photosensitive surface, a light scanner having a plurality of light reflecting facets interposed in the optical path between said light source and said photosensitive surface for scanning the light beam in a plane such that the light beam scans across said photosensitive surface, and a positive cylinder mirror interposed in the optical path between said light scanner and said photosensitive surface, said mirror being oriented such that it has no power in said plane of the scanning light beam and power in a plane normal to said plane of said scanning light beam.

2. An optical scanning system which compensates for alignment errors between adjacent facets of a scanning polygon while controlling sagittal field curvature, comprising, a light source for generating a light beam, a photosensitive surface, a light scanner having a plurality of light reflecting facets interposed in the optical path between said light source and said photosensitive surface for scanning the light beam in a plane such that the light beam scans across said photosensitive surface, a positive cylinder mirror interposed in the optical path between said light scanner and said photosensitive surface, said mirror being oriented such that it has no power in said plane of the scanning light beam and power in a plane normal to said plane of said scanning light beam, and a negative cylinder lens interposed in the optical path between said light scanner and said mirror, said lens being oriented such that it has no power in said plane of the scanning light beam and power in said plane normal to said plane of said scanning light beam.

* * * * *